United States Patent
Yen

(10) Patent No.: US 12,283,095 B2
(45) Date of Patent: Apr. 22, 2025

(54) IMAGE DETECTION METHOD, ELECTRONIC DEVICE, AND STORAGE MEDIUM

(71) Applicant: HON HAI PRECISION INDUSTRY CO., LTD., New Taipei (TW)

(72) Inventor: Chien-Wu Yen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 424 days.

(21) Appl. No.: 17/740,931

(22) Filed: May 10, 2022

(65) Prior Publication Data

US 2023/0101901 A1    Mar. 30, 2023

(30) Foreign Application Priority Data

Sep. 30, 2021   (CN) .......................... 202111165815.1

(51) Int. Cl.
*G06V 10/82*      (2022.01)
(52) U.S. Cl.
CPC .................................. *G06V 10/82* (2022.01)

(58) Field of Classification Search
CPC ............ G06N 3/08; G06V 10/82; Y02D 10/00
See application file for complete search history.

(56) References Cited

U.S. PATENT DOCUMENTS

| | | |
|---|---|---|
| 2005/0059876 A1 | 3/2005 | Krishnan et al. |
| 2021/0201078 A1 | 7/2021 | Yao et al. |
| 2024/0046504 A1* | 2/2024 | Chen ..................... G06V 10/764 |
| 2024/0202528 A1* | 6/2024 | Wang ..................... G06N 3/082 |

* cited by examiner

*Primary Examiner* — Manuchehr Rahmjoo
(74) *Attorney, Agent, or Firm* — ScienBiziP, P.C.

(57) ABSTRACT

An image detection and classification method for faster detection and classification by a neural network is applied to a neural network model including n operators. The neural network model is mapped to a singly-linked list. A vector of data pairs corresponding to the singly-linked list is established, and operator subsets of the neural network model are determined according to the vector. A target image is input to the neural network model, and input data and output data of the operator subset are recorded. The neural network model is applied to detect the target image, and a detection result is output according to the input data and the output data. The method can detect images quickly.

3 Claims, 5 Drawing Sheets

IMAGE DETECTION METHOD, ELECTRONIC DEVICE, AND STORAGE MEDIUM

FIELD

The subject matter herein generally relates to image processing, specifically an image detection method, an electronic device, and a storage medium.

BACKGROUND

When an image is detected by a neural network model installed in an electronic device, data as to features of the image will be passed between operators of the neural network model. Input data and output data of each operator should be recorded, and further detection of the image is performed accordingly. Some neural network models may include many operators, and amounts of input and output data of the operators may be huge. The huge amounts of data may use a lot of memory of the electronic device, resulting in slow image detection.

BRIEF DESCRIPTION OF THE DRAWINGS

In order to more clearly describe the technical solutions in the embodiments of the present disclosure or the prior art, the following will briefly introduce the drawings that need to be used in the description of the embodiments or the prior art. Obviously, the drawings in the following description are only examples. For those of ordinary skill in the art, other drawings can be obtained according to the provided drawings without creative work.

DETAILED DESCRIPTION

For clarity, of illustration of objectives, features and advantages of the present disclosure, the drawings combined with the detailed description illustrate the embodiments of the present disclosure hereinafter. It is noted that embodiments of the present disclosure and features of the embodiments can be combined, when there is no conflict.

Figure 1:
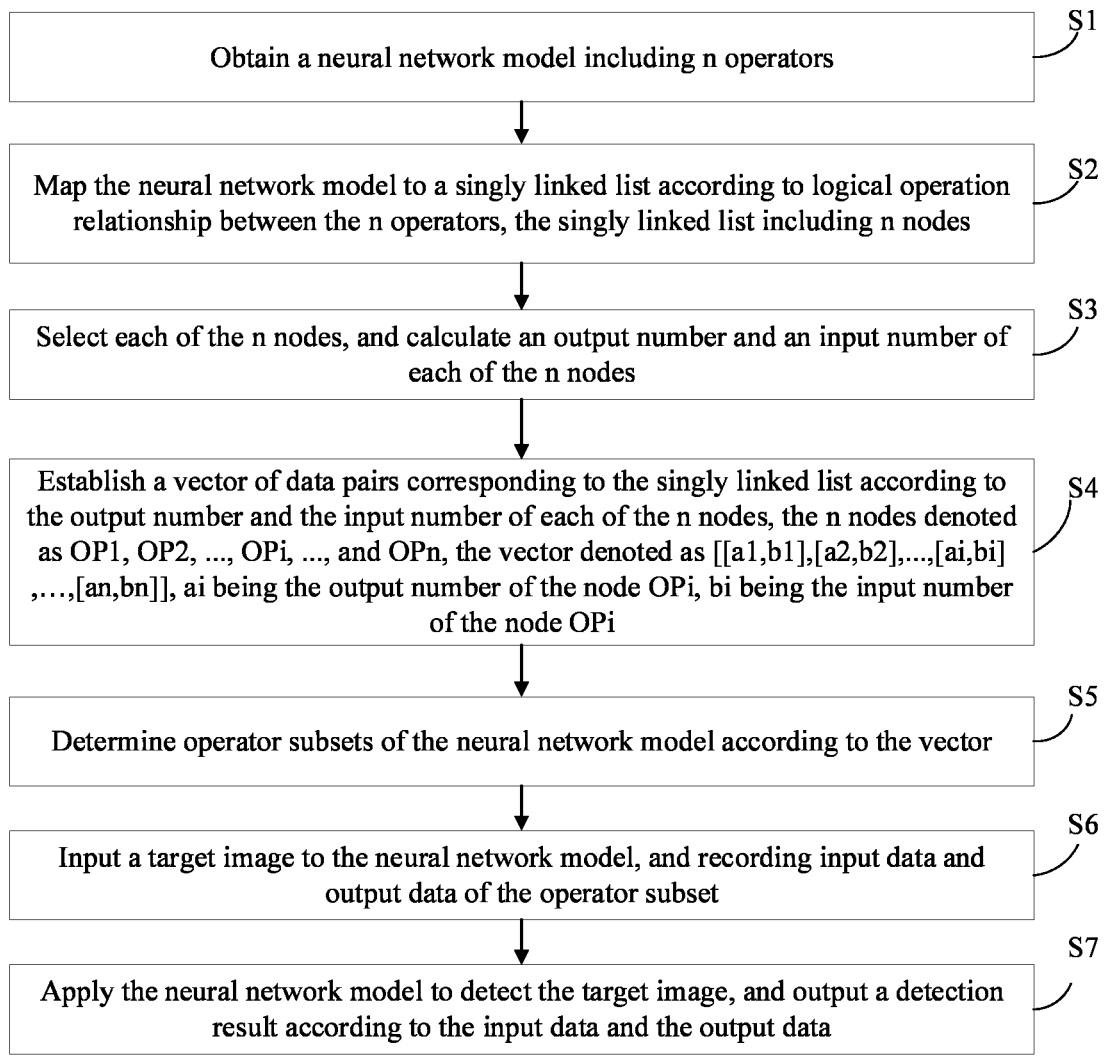
FIG. 1 is a flowchart of an image detection method provided in one embodiment of the present disclosure.

FIG. 1 is a flowchart of an image detection method in one embodiment. The method can detect and classify images quickly. According to different requirements, the order of the blocks in the flowchart may be changed, and some blocks may be omitted.

Figure 5:
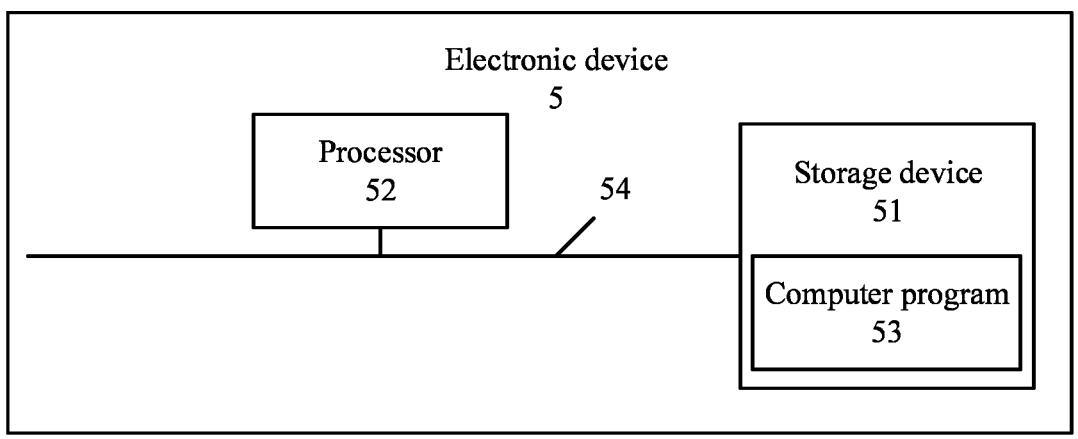
FIG. 5 is a block diagram of an electronic device implementing the method in one embodiment of the present disclosure.

The method may be executed by an electronic device (e.g., electronic device 5 in FIG. 5). The electronic device may be a device that can perform processing according to preset or stored instructions, such as a desktop computer, a notebook, a palmtop computer, or a cloud server. Hardware of the electronic device may include, but is not limited to, a microprocessor, an disclosure specific integrated circuit (ASIC), a field-programmable gate array (FPGA), a digital signal processor (DSP), an embedded device, etc.

The electronic device can be any electronic product that can interact with a user, such as a personal computer, a tablet computer, a smart phone, a personal digital assistant (PDA), a game console, an Internet protocol television (IPTV), a smart wearable device, etc.

The electronic device may also be a network device and/or user equipment. The network device includes, but is not limited to, a single network server, a server group formed by multiple network servers, or a cloud formed by a large number of hosts or network servers based on cloud computing.

The electronic device can be included in a network. The network can be, but is not limited to, the Internet, a wide area network, a metropolitan area network, a local area network, a virtual private network (VPN), and the like.

In block S1, the electronic device obtains a neural network model. The neural network model includes n operators.

The neural network model may be obtained from a network. The neural network model may be optimized after obtaining from the network. Optimization of the neural network model can include operations such as operator fusion, network pruning, model quantization, and network cutting on the neural network model. In the embodiment, the neural network model includes n operators denoted as op1, op2, . . . , opn.

In block S2, the electronic device maps the neural network model to a singly-linked list according to logical relationship between the n operators. The singly-linked list includes n nodes.

In one embodiment, the singly-linked list includes a plurality of nodes, and the plurality of nodes are arranged in one direction. A node arranged at a starting position of the singly-linked list is a head or the start of the singly-linked list, and a node arranged at an end position of the singly-linked list is a tail or the last of the singly-linked list. The singly-linked list can be read from the head to the tail in the direction.

The logical relationship between the n operators can be understood as a data transfer relationship between the operators. For example, the neural network model includes operator A, operator B, operator C, and operator D. Output data of the operator A is input data to the operator B and the operator C, and output data of the operator B and output data of the operator C is input data to the operator D. The singly-linked list can include A→B→C→D, or A→C→B→D.

Figure 3:
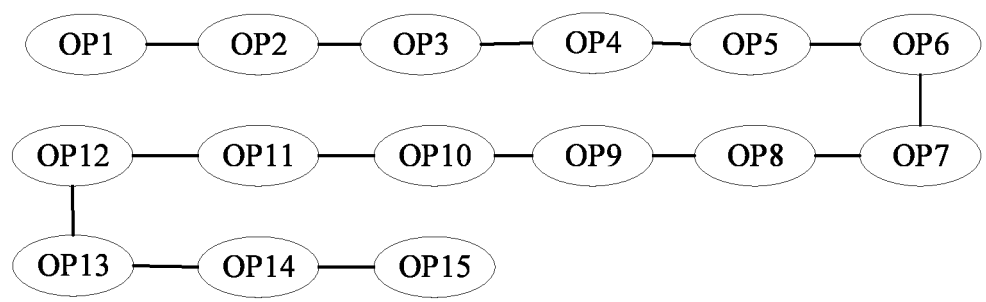
FIG. 3 shows a singly-linked list in one embodiment of the present disclosure.

In one embodiment, the singly-linked list includes n nodes, the n nodes can be respectively denoted as OP1, OP2, . . . , OPn. Each of the n nodes corresponds to an operator in the neural network model. According to the logical relationship between the n operators, multiple singly-linked lists can be obtained. In one embodiment, a singly-linked list OP1→OP2→ . . . →OPn is selected. FIG. 3 shows a singly-linked list in one embodiment of the present disclosure.

In block S3, the electronic device selects each of the n nodes, and calculates an output number and an input number of each of then nodes.

An output number of the node OPi can be denoted as ai, and an input number of the node OPi can be denoted as bi. The output number ai of the node OPi indicates how many operators that the operator opi sends data to in the neural network model, and the input number bi of the node OPi indicates how many operators the operator opi receives data from in the neural network model.

Figure 4:
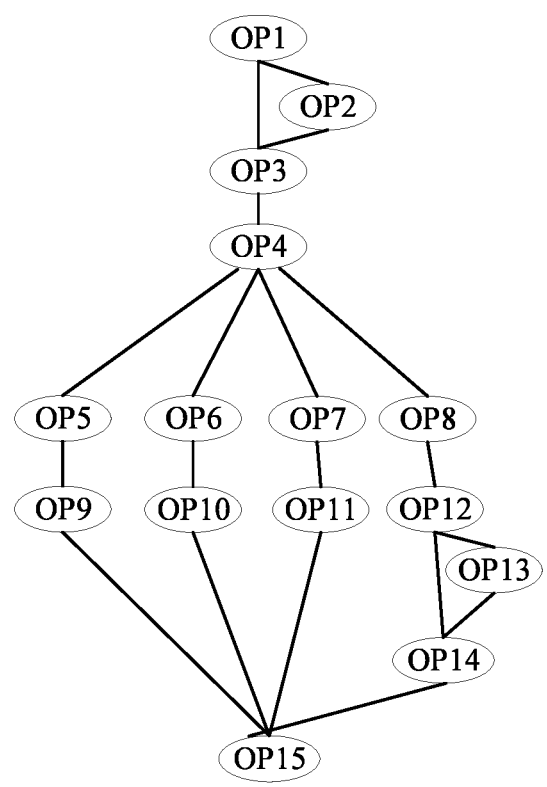
FIG. 4 shows data transmission between nodes in one embodiment of the present disclosure.

FIG. 4 shows data transmission between nodes in one embodiment of the present disclosure. In FIG. 4, an input number of the node OP4 is 1, and an output number of the node OP4 is 4.

In block S4, the electronic device establishes a vector of data pairs corresponding to the singly-linked list according to the output number and the input number of each of the n nodes. The vector is denoted as [[a1,b1],[a2,b2], . . . , [ai,bi], . . . ,[an,bn]], where ai is the output number of the node OPi, and bi is the input number of the node Opi.

In one embodiment, the vector is a two-dimensional array established according to output numbers and input numbers of the nodes OP1, OP2, . . . , OPn.

In block S5, the electronic device determines operator subsets of the neural network model according to the vector.

When applying the neural network model to perform image detection, the electronic device records input data and output data of operators of the neural network model. The amount of input and output data may be huge. In order to increase a speed of the image detection, the electronic device can determine the operator subsets of the neural network model. The electronic device can record input data and output data of the operator subsets, and accordingly perform the image detection.

In one embodiment, the electronic device determines a plurality of node subsets according to the vector, and determines the operator subsets of the neural network model according to the plurality of node subsets.

Figure 2:
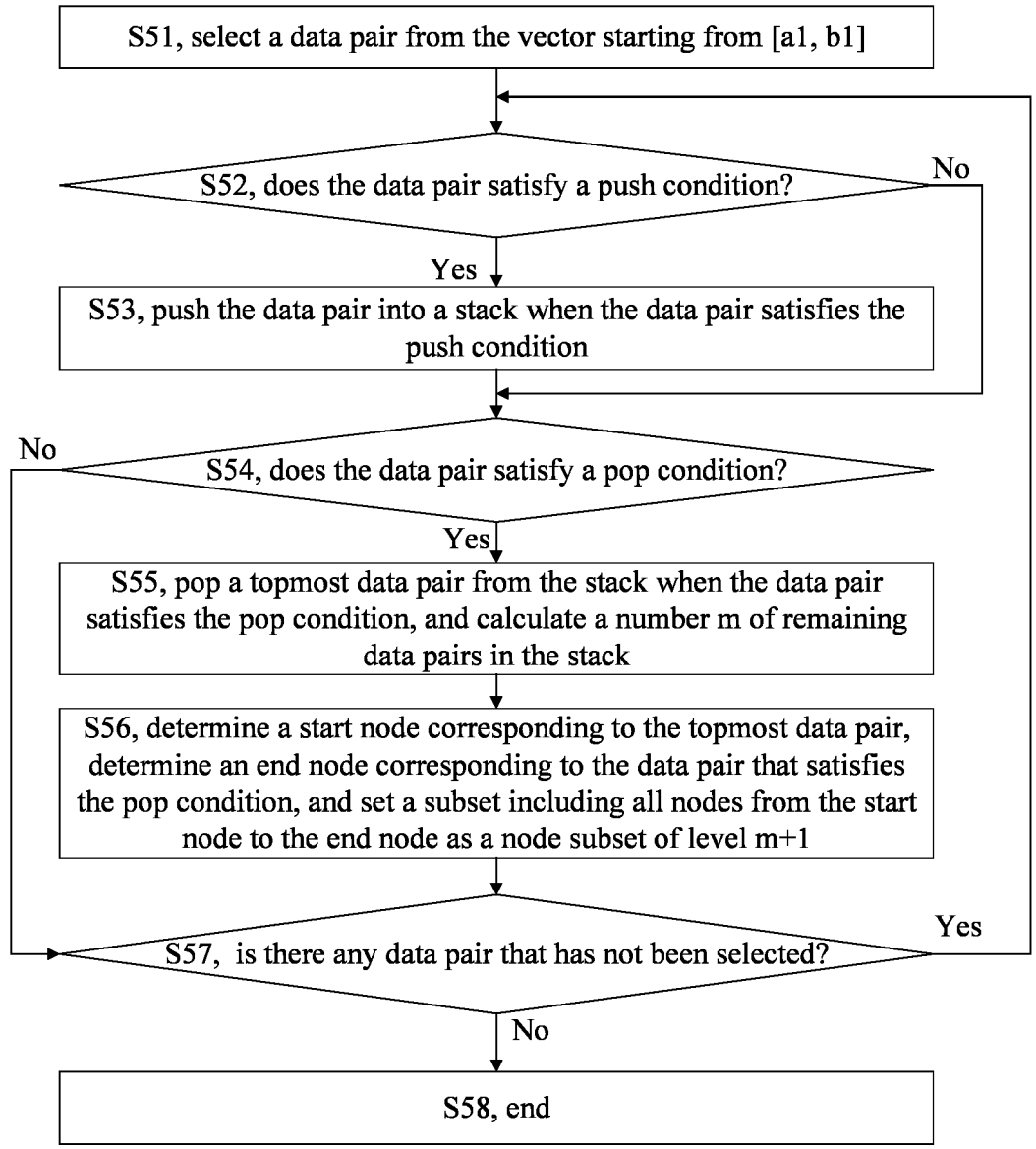
FIG. 2 is a detailed flowchart of block S5 in FIG. 1.

FIG. 2 is a detailed flowchart of block S5 in FIG. 1. According to different requirements, the order of the blocks in the flowchart may be changed, and some blocks may be omitted.

In block S51, the electronic device selects a data pair from the vector starting from [a1, b1].

In block 52, the electronic device determines whether the data pair satisfies a push condition. The process goes to block 54 if the data pair does not meet the push condition. The push condition is used for push data into the stack. In one embodiment, the push condition is that the output number of ai in the data pair [ai,bi] is greater than or equal to 2.

In block 53, the electronic device pushes the data pair into a stack if the data pair satisfies the push condition. Initially, the stack is empty.

In block 54, the electronic device determines whether the data pair satisfies a pop condition. The process goes to block 57 if the data pair does not satisfy the pop condition. The push condition is used for pop data from the stack. In one embodiment, the pop condition is that the input number of bi in the data pair [ai,bi] is greater than or equal to 2.

If the data pair satisfies the pop condition, in block 55, the electronic device pops a topmost data pair from the stack and calculates a number m of remaining data pairs in the stack.

In block 56, the electronic device determines a start node corresponding to the topmost data pair, determines an end node corresponding to the data pair that satisfies the pop condition, and sets a subset including all nodes from the start node to the end node as a node subset of level m+1.

In block 57, the electronic device determines whether there are one or more data pairs that have not been selected in the vector. The process goes to block 51 if there are one or more data pairs that have not been selected in the vector.

If there is no unselected data pair in the vector, in block S58, the process ends.

Among the plurality of node subsets obtained according to S51 to S58, there are no two node subsets which have an identical node, or a certain node subset may belong to other node subset. For different situations, methods of determining the operator subsets of the neural network model according to the plurality of node subsets may also be different.

In one embodiment, determining the operator subsets of the neural network model according to the plurality of node subsets may include: traversing the plurality of node subsets; and setting each of the plurality of node subsets as an operator subset of the neural network model if there is no identical node in any two of the node subsets.

In another embodiment, determining the operator subsets of the neural network model according to the plurality of node subsets may include: traversing the plurality of node subsets to obtain first node subsets and second node subsets, wherein the second node subsets comprise the first node subsets; removing nodes that are identical to the first node subsets from the second node subsets to obtain filtered second node subsets; and setting nodes in the filtered second node subsets as an operator subset of the neural network model. There is no identical node in the first node subsets and the filtered second node subsets.

For example, the singly-linked list is OP1→ OP2→ . . . →OP15. OP1 to OP15 are nodes of the singly-linked list corresponding to the operators op1 to op15 of the neural network model. A vector of data pairs corresponding to the nodes in the singly-linked list is [[2,1], [1,1], [1,2], [4,1], [1,1], [1,1], [1,1], [1,1], [1,1], [1,1], [2,1], [1,1], [1,2], [1,4]], so there are fifteen data pairs in the vector. In the beginning, the stack is empty. The electronic device traverses the data pairs in the vector starting from the first data pair [2,1]. Since the first data pair [2,1] satisfies the push condition, the electronic device pushes the first data pair [2,1] into the stack. Since the second data pair [1,1] does not satisfy either the push condition or the pop condition, the stack is unchanged. Since the third data pair [1,2] satisfies the pop condition, the electronic device pops the first data pair [2,1] from the stack, the first data pair [2,1] is the topmost data pair. After the electronic device pops the first data pair [2,1] from the stack, the stack is empty, i.e., the number m of remaining data pairs in the stack is 0. The start node corresponding to the topmost data pair is OP1, the end node corresponding to the data pair that satisfies the pop condition is OP3, a subset including the nodes OP1, OP2, and OP3 is a node subset of level 1.

Next, since the fourth data pair [4,1] satisfies the push condition, the electronic device pushes the fourth data pair [4,1] into the stack. Since none of the fifth to eleventh data pairs [1,1] satisfy the push condition or the pop condition, the stack is unchanged. Since the twelfth data pair [2,1] satisfies the push condition, the electronic device pushes the twelfth data pair [2,1] into the stack. Since the thirteenth data pairs [1,1] does not satisfy either the push condition or the pop condition, the stack is unchanged. Since the fourteenth data pair [1,2] satisfies the pop condition, the electronic device pops the twelfth data pair [2,1] from the stack. After the electronic device pops the twelfth data pair [2,1] from the stack, there is one remaining data pair (i.e., the fourth data pair [4,1]), that is, the number m of remaining data pairs in the stack is 1. The start node corresponding to the topmost data pair is OP12, the end node corresponding to the data pair that satisfies the pop condition is OP14, a subset including the nodes is OP12, OP13, and OP14 is a node subset of level 2.

Next, since the fifteenth data pair [1,4] satisfies the pop condition, the electronic device pops the fourth data pair [4,1] from the stack. After the electronic device pops the fourth data pair [4,1] from the stack, no data pair remains in the stack, i.e., the number m of remaining data pairs in the stack is 0. The start node corresponding to the topmost data pair is OP4, the end node corresponding to the data pair that satisfies the pop condition is OP15, a subset including the nodes is OP4, OP5, . . . , and OP15 is a node subset of level 1.

Therefore, the electronic device determines that the operator subsets of the neural network model include two operator subsets of level 1 and one operator subset of level 2. One operator subset of level 1 includes the operators op1, op2, and op3, and the other operator subset of level 1 includes the operators op4, op5, op6, op7, op8, op9, op10, op11 and op15. The operator subset of level 2 includes op12, op13, and op14.

In block S6, the electronic device inputs a target image to the neural network model, and records input data and output data of the operator subset.

When the neural network model detects the target image, features of the target image are transmitted between the operators of the neural network model. The electronic device records the input data and the output data of the operators subsets.

In one embodiment, input data of an operator subset is output data of a start operator corresponding to the start node, and output data of the operator subset is an end operator corresponding to the end node. According to the method provided in the present disclosure, it is the input data and the output data of the operator subsets which is recorded, rather than the input and output data of all operators of the neural network model being recorded. As such, amount of data recorded for image detection is greatly reduced.

In block S7, the electronic device applies the neural network model to detect the target image, and outputs a detection result according to the input data and the output data.

In one embodiment, the electronic device applies the neural network model to detect a human face in the target image. The electronic device may extract features such as color, texture, and edges of face in the target image. Therefore, the input data and the output data may include color data, texture data, and edge data. The electronic device detects the human face in the target image by transmitting the input data and the output data between the operator subsets of the neural network model. As a result, a detection of face is output.

FIG. 1 describes in detail the image detection method of the present disclosure. Hardware architecture that implements the image detection method is described in conjunction with FIG. 5.

FIG. 5 is a block diagram of an electronic device implementing the method in one embodiment of the present disclosure. The electronic device 5 may include a storage device 51 and at least one processor 52. A computer program 53 (such as an image detection system) may be stored in the storage device 51 and executable by the processor 52. The processor 52 may execute the computer program to implement the blocks in the image detection method described above, such as the blocks S1 to S7 in FIG. 1.

The electronic device 5 may be a device that can perform processing according to preset or stored instructions, such as a desktop computer, a notebook, a palmtop computer, or a cloud server. Hardware of the electronic device may include, but is not limited to, a microprocessor, an application-specific integrated circuit (ASIC), a field-programmable gate array (FPGA), a digital signal processor (DSP), an embedded device, etc.

Those skilled in the art will understand that electronic device 5 is only an example, and does not constitute a limitation. Other examples of electronic device 5 may include more or fewer components than shown in FIG. 5, or combine some components, or have different components.

The storage device 51 may be used to store the computer program, and the processor 52 implements the electronic device by running or executing the computer program or module stored in the storage device 51 and calling up data stored in the storage device 51. The storage device 51 may include a storage program area and a storage data area. The storage program area may store an operating system, and programs required by at least one function, etc.; the storage data area may store data and the like created in the use of the electronic device 5. In addition, the storage device 51 may include non-volatile memory, such as a hard disk, a memory, a plug-in hard disk, a smart memory card (SMC), a secure digital (SD) card, a flash memory card (Flash Card), at least one magnetic disk storage device, flash memory device, or other non-volatile solid state storage device.

The processor 52 may be a central processing unit (CPU) or other general-purpose processor, a digital signal processor (DSP), an application-specific integrated circuit (ASIC), a field-programmable gate array (FPGA) or other programmable logic device, a discrete gate, or a transistor logic device, or a discrete hardware component, etc. The processor 52 may be a microprocessor or any conventional processor. The processor 52 may be a control center of the electronic device 5, and connect various parts of the entire electronic device 5 by using various interfaces and lines.

In an exemplary embodiment, the computer program may be divided into one or more modules, and the one or more modules are stored in the storage device 51 and executed by the processor 52 to complete the image detection method of the present disclosure. The one or more modules can be a series of computer-readable instruction segments capable of performing specific functions, and the instruction segments are used to describe execution processes of the computer program in the electronic device 5.

When the modules integrated in the electronic device 5 are implemented in the form of software functional units and used as independent units, they can be stored in a non-transitory readable storage medium. According to this understanding, all or part of the processes in the methods of the above embodiments implemented by the present disclosure can also be completed by related hardware instructed by computer-readable instructions. The computer-readable instructions may be stored in a non-transitory readable storage medium. The computer-readable instructions, when executed by the processor, may implement the blocks of the foregoing method embodiments. The computer-readable instructions include computer-readable instruction codes, and the computer-readable instruction codes can be source code, object code, an executable file, or in some other intermediate form. The non-transitory readable storage medium may include any entity or device capable of carrying the computer-readable instruction code, a recording medium, a U disk, a mobile hard disk, a magnetic disk, an optical disk, a computer memory, and a read-only memory (ROM).

Although not shown, the electronic device 5 may also include a power source (such as a battery) for supplying power to various components. The power source may be logically connected to the at least one processor 52 through a power management device, so as to realize functions such as charging, discharging, and power consumption management. The power supply may also include direct current or alternating current power supplies, recharging devices, power failure detection circuits, power converters or inverters, and power status indicators. The electronic device 5 may also include various sensors, BLUETOOTH modules, WI-FI modules, etc.

In several embodiments provided in the preset disclosure, it should be understood that the disclosed electronic device and method may be implemented in other ways. For example, the embodiments of the electronic device described above are merely illustrative. For example, the units are only divided according to logical function, and there may be other manners of division in actual implementation.

The modules described as separate components may or may not be physically separated, and the components displayed as modules may or may not be physical modules, that is, may be located in one place, or may be distributed on multiple network elements. Some or all of the modules may be selected according to actual needs to achieve the purpose of the solution of this embodiment.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable an electronic device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

Finally, the above embodiments are only used to illustrate technical solutions of the present disclosure, and are not to be taken as restrictions on the technical solutions. Although the present disclosure has been described in detail with reference to the above embodiments, those skilled in the art should understand that the technical solutions described in one embodiments can be modified, or some of technical features can be equivalently substituted, and that these modifications or substitutions are not to detract from the essence of the technical solutions or from the scope of the technical solutions of the embodiments of the present disclosure.

I claim:

1. An image detection method applied to an electronic device, comprising:
    obtaining a neural network model comprising n operators;
    mapping the neural network model to a singly-linked list according to logical relationship between the n operators, the singly-linked list comprising n nodes;
    selecting each of the n nodes, and calculating an output number and an input number of each of the n nodes;
    establishing a vector of data pairs corresponding to the singly-linked list according to the output number and the input number of each of the n nodes, the n nodes denoted as OP1, OP2, . . . , OPi, . . . , and OPn, the vector denoted as [[a1,b1], [a2,b2], . . . , [ai,bi], . . . , [an,bn]], ai being the output number of the node OPi, bi being the input number of the node OPi, wherein the output number ai of the node OPi indicates a number of operators that receive data when operators corresponding to the node OPi transmit the data outward in the neural network model, and the output number bi of the node OPi indicates a number of other operators when the operators corresponding to the node OPi receive data from the other operators of the neural network model;
    determining operator subsets of the neural network model according to the vector, comprising: determining a plurality of node subsets according to the vector; and determining the operator subsets of the neural network model according to the plurality of node subsets;
    wherein determining a plurality of node subsets according to the vector comprises: step 1, selecting a data pair from the vector starting from [a1, b1]; step 2, determining whether the data pair satisfies a push condition, and going to step 4 when the data pair does not meet the push condition; step 3, pushing the data pair into a stack when the data pair satisfies the push condition; step 4, determining whether the data pair satisfies a pop condition, and going to step 7 when the data pair does not satisfy the pop condition; step 5, popping a topmost data pair from the stack when the data pair satisfies the pop condition, and calculating a number m of remaining data pairs in the stack; step 6, determining a start node corresponding to the topmost data pair, determining an end node corresponding to the data pair that satisfies the pop condition, and setting a subset including all nodes from the start node to the end node as a node subset of level m+1; and step 7, determining whether there are one or more data pairs that have not been selected in the vector, and going to step 1 when there are one or more data pairs that have not been selected in the vector;
    inputting a target image to the neural network model, and recording input data and output data of the operator subset; and
    applying the neural network model to detect the target image, and outputting a detection result according to the input data and the output data;
    wherein when the input number of bi in the data pair [ai,bi] is greater than or equal to 2, it is determined that the data pair [ai,bi] satisfies the pop condition; and
    when the output number of ai in the data pair [ai,bi] is greater than or equal to 2, it is determined that the data pair [ai,bi] satisfies the push condition;
    wherein each of the operator subsets comprising more than one operators of the n operators, and a total number of operators included in all the operator subsets equal to n;

wherein the input data of the operator subset is output data of a start operator corresponding to the start node, and the output data of the operator subset is input data of an end operator corresponding to the end node.

2. An electronic device comprising:
at least one processor, and
a storage device storing computer-readable instructions, which when executed by the at least one processor, cause the at least one processor to:
obtain a neural network model comprising n operators;
map the neural network model to a singly-linked list according to logical relationship between the n operators, the singly-linked list comprising n nodes;
select each of the n nodes, and calculate an output number and an input number of each of the n nodes;
establish a vector of data pairs corresponding to the singly-linked list according to the output number and the input number of each of the n nodes, the n nodes denoted as OP1, OP2, . . . , OPi, . . . , and OPn, the vector denoted as [[a1,b1], [a2,b2], . . . , [ai,bi], . . . , [an,bn]], ai being the output number of the node OPi, bi being the input number of the node OPi, wherein the output number ai of the node OPi indicates a number of operators that receive data when operators corresponding to the node OPi transmit the data outward in the neural network model, and the output number bi of the node OPi indicates a number of other operators when the operators corresponding to the node OPi receive data from the other operators of the neural network model;
determine operator subsets of the neural network model according to the vector;
input a target image to the neural network model, and recording input data and output data of the operator subset; and
apply the neural network model to detect the target image, and output a detection result according to the input data and the output data;
wherein the at least one processor is further caused to: determine a plurality of node subsets according to the vector; and determine the operator subsets of the neural network model according to the plurality of node subsets;
wherein the at least one processor is further caused to:
step 1, select a data pair from the vector starting from [a1, b1];
step 2, determine whether the data pair satisfies a push condition, and go to step 4 when the data pair does not meet the push condition;
step 3, push the data pair into a stack when the data pair satisfies the push condition;
step 4, determine whether the data pair satisfies a pop condition, and go to step 7 when the data pair does not satisfy the pop condition;
step 5, pop a topmost data pair from the stack when the data pair satisfies the pop condition, and calculate a number m of remaining data pairs in the stack;
step 6, determine a start node corresponding to the topmost data pair, determine an end node corresponding to the data pair that satisfies the pop condition, and set a subset including all nodes from the start node to the end node as a node subset of level m+1; and
step 7, determine whether there are one or more data pairs that have not been selected in the vector, and go to step 1 when there are one or more data pairs that have not been selected in the vector;

wherein each of the operator subsets comprising more than one operators of the n operators, and a total number of operators included in all the operator subsets equal to n;
wherein the input data of the operator subset is output data of a start operator corresponding to the start node, and the output data of the operator subset is input data of an end operator corresponding to the end node.

3. A non-transitory storage medium having stored thereon computer-readable instructions that, when the computer-readable instructions are executed by a processor to implement the following method:
obtaining a neural network model comprising n operators;
mapping the neural network model to a singly-linked list according to logical relationship between the n operators, the singly-linked list comprising n nodes;
selecting each of the n nodes, and calculating an output number and an input number of each of the n nodes;
establishing a vector of data pairs corresponding to the singly-linked list according to the output number and the input number of each of the n nodes, the n nodes denoted as OP1, OP2, . . . , OPi, . . . , and OPn, the vector denoted as [[a1,b1], [a2,b2], . . . , [ai,bi], . . . , [an,bn]], ai being the output number of the node OPi, bi being the input number of the node OPi, wherein the output number ai of the node OPi indicates a number of operators that receive data when operators corresponding to the node OPi transmit the data outward in the neural network model, and the output number bi of the node OPi indicates a number of other operators when the operators corresponding to the node OPi receive data from the other operators of the neural network model;
determining operator subsets of the neural network model according to the vector, comprising: determining a plurality of node subsets according to the vector; and determining the operator subsets of the neural network model according to the plurality of node subsets;
inputting a target image to the neural network model, and recording input data and output data of the operator subset; and
applying the neural network model to detect the target image, and outputting a detection result according to the input data and the output data;
wherein determining a plurality of node subsets according to the vector comprises:
step 1, selecting a data pair from the vector starting from [a1, b1];
step 2, determining whether the data pair satisfies a push condition, and going to step 4 when the data pair does not meet the push condition;
step 3, pushing the data pair into a stack when the data pair satisfies the push condition;
step 4, determining whether the data pair satisfies a pop condition, and going to step 7 when the data pair does not satisfy the pop condition;
step 5, popping a topmost data pair from the stack when the data pair satisfies the pop condition, and calculating a number m of remaining data pairs in the stack;
step 6, determining a start node corresponding to the topmost data pair, determining an end node corresponding to the data pair that satisfies the pop condition, and setting a subset including all nodes from the start node to the end node as a node subset of level m+1; and
step 7, determining whether there are one or more data pairs that have not been selected in the vector, and going to step 1 when there are one or more data pairs that have not been selected in the vector;

wherein each of the operator subsets comprising more than one operators of the n operators, and a total number of operators included in all the operator subsets equal to n;

wherein the input data of the operator subset is output data of a start operator corresponding to the start node, and the output data of the operator subset is input data of an end operator corresponding to the end node.

* * * * *